United States Patent [19]

Leon

[11] Patent Number: 5,704,390
[45] Date of Patent: Jan. 6, 1998

[54] AUTOMATIC VARIABLE DEMAND FLOW REGULATOR

[75] Inventor: Eric Leon, Ft. Lauderdale, Fla.

[73] Assignee: Water Management Equipment Corporation, Boca Raton, Fla.

[21] Appl. No.: 603,078

[22] Filed: Feb. 20, 1996

[51] Int. Cl.[6] .................................................. G05D 7/01
[52] U.S. Cl. .................. 137/357; 137/508; 137/512.1; 137/543.15; 137/599
[58] Field of Search ....................... 137/599, 358, 137/357, 501, 508, 110, 512.1, 538, 513.7, 543.15

[56] References Cited

U.S. PATENT DOCUMENTS

| | | | |
|---|---|---|---|
| 2,196,425 | 4/1940 | Neubling | 137/599 X |
| 2,604,110 | 7/1952 | Gilder | 137/357 |
| 5,082,018 | 1/1992 | Caswell et al. | 137/357 |
| 5,287,876 | 2/1994 | Takahashi | 137/357 X |
| 5,379,797 | 1/1995 | Rogers et al. | 137/508 X |

*Primary Examiner*—Stephen M. Hepperle
*Attorney, Agent, or Firm*—Cooper & Dunham LLP

[57] ABSTRACT

An automatic variable demand flow regulator regulates water flow into a building based on variable supply and demand pressures. The regulator is positioned between a building and a water supply meter for the building. The regulator includes a piston that moves in response to pressure at both the supply side and the demand side of the regulator, and the piston is brought to rest when equilibrium is reached and the supply side and demand side pressures are balanced. When demand is low the piston is in a closed position and flow through the regulator is minimal. When demand increases to a condition where flow through the supply side of the regulator cannot provide equal pressures on both the supply and demand sides, the piston will automatically move toward the demand side to convey additional water to the demand side until the pressures are equalized on both sides of the piston.

12 Claims, 8 Drawing Sheets

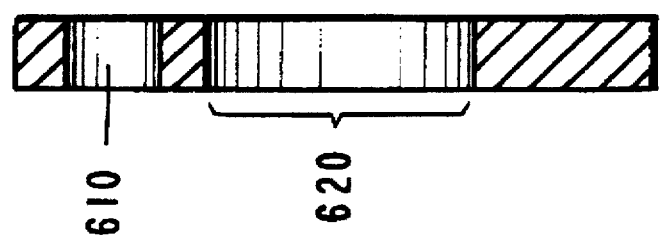
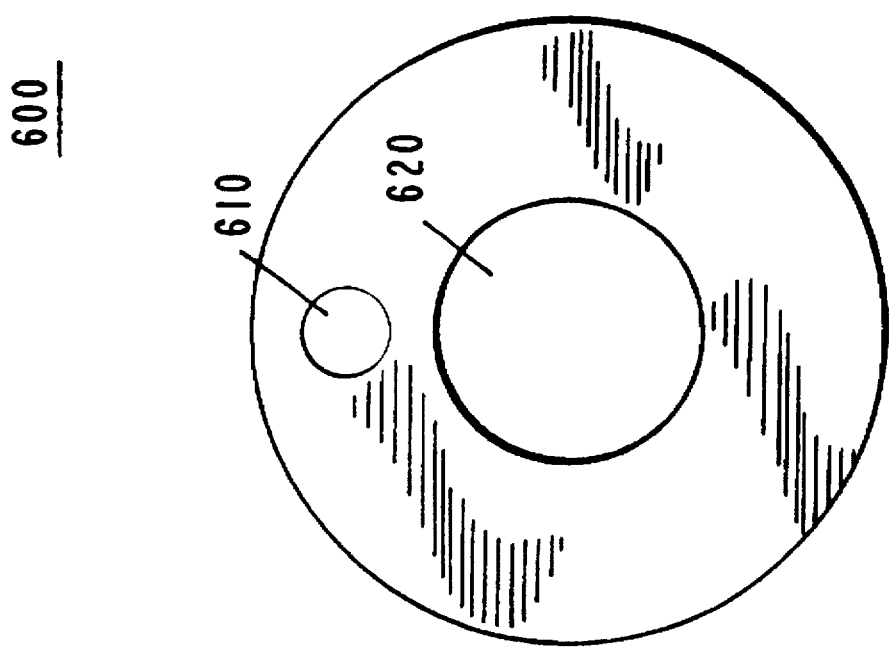

5,704,390

AUTOMATIC VARIABLE DEMAND FLOW REGULATOR

This invention relates to water flow regulators, and in particular to a movable piston that regulates and controls the variable flow of incoming water based on water demand.

BACKGROUND AND PRIOR ART

Many commercial buildings such as rental apartment buildings and rental complexes have the tenants pay for their monthly water bill as part of their monthly condominium fee. The main water line into the building usually has a single meter for the entire building. Since most tenants do not control the flow volume into their individual apartment units, the tenants are charged for using water dependent upon the incoming volume from the single incoming water line for the entire building. For example, if the demand is increased in the morning, those users would use less water then those using water for the same purpose during decreased demand periods. So a greater volume of water flows out of the taps and faucets during low use periods. Tenants are responsible for the greater usage of water because the single meter measures this usage. Generally, tenants are not concerned with water conservation because their bills are built into the condominium association fees. For example, a building tenant is less likely than a home-owner to install water saving devices that restrict the flow of water and when these devices are installed by owners these devices are often removed by tenants. As a result, building tenants inherently are paying more than they realize for water that is coming into the building. Water utility companies are usually not concerned with this extra expense incurred by the tenants since the larger the usage of water the greater the profits for the water company.

Thus, the need exists for overcoming the problems presented above.

SUMMARY OF THE INVENTION

The first objective of the present invention is to provide a device for regulating the flow of fluid through an incoming waterline pipe with a movable piston.

The second object of this invention is to provide a device for regulating and controlling the flow of incoming water based on demand.

The third object of this invention is to provide an automatic flow regulation device that controls water flow between the meter and the users.

The invention regulates and restricts the flow of liquids through the use of mechanical and flow characteristic properties and provides for flow regulation through the use of a movable piston. The piston allows for the exposure of increasing or decreasing surface areas, which the liquid must flow through in order to reach the demand location. The piston is controlled by the pressure at both the supply side and the demand side of the device and is brought to rest when equilibrium is reached as a result of the internal pressure becoming balanced within the device. In order to achieve maximum efficiency, a compression spring and/or a bleeder valve is used in order to resist the natural forces of the liquid that wants to push the device to a maximum open position. When the piston is in the "up" (closed) position, the flow through the device is minimal. The only flow realized is through the piston. This minimal flow results in equal pressures on both the top and bottom of the piston and it does not move at the low flow condition until there is a minimal change in downline pressure. When demand increases on the outlet side of the device and the volume of water being supplied is not adequate to provide equal pressures on the top and bottom of the piston, the piston will move down (toward the outlet side of the device) to convey additional water toward the outlet side of the device and compressing the spring simultaneously. This continues until the pressure is equalized on both sides of the piston and provides for "variable flow." (In order to provide maximum flow reduction to be effective in the system that the device is installed in, the compression characteristics of the bleeder valve spring are designed to permit a drop in pressure across the device without compromising the demands of the overall system.) The holes in the center tube are designed to provide the maximum flexibility for the device under varying pressure and flow conditions. Each system where this device is to be installed is individually evaluated in order to determine the spring requirements.

A second embodiment has a pressure differential valve installed between the intermediate chamber and the discharge chamber. This valve senses any change in downstream pressure and immediately "dumps" the water from the intermediate chamber into the discharge chamber. When this occurs the piston will move from the position it was in, towards the intermediate chamber exposing additional surface area on the center tube where the liquid will then flow into the discharge chamber to the source of the demand. When the demand ceases the pressure in the discharge chamber will increase until it reaches equilibrium with the supply pressure in the intermediate chamber. The pressure differential valve will then close and the piston will move towards the inlet chamber with the assistance of a spring until equilibrium is again reached. This process occurs continuously and allows for automatic variable demand flow regulation.

Further objects and advantages of this invention will be apparent from the following detailed description of a presently preferred embodiment which is illustrated schematically in the accompanying drawings.

BRIEF DESCRIPTION OF THE FIGURES

FIG. 8A is a front view of the exit end plate of the novel regulator of FIG. 2 along arrow B.

FIG. 8B is a side view of the exit end plate of the novel regulator of FIG. 2.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
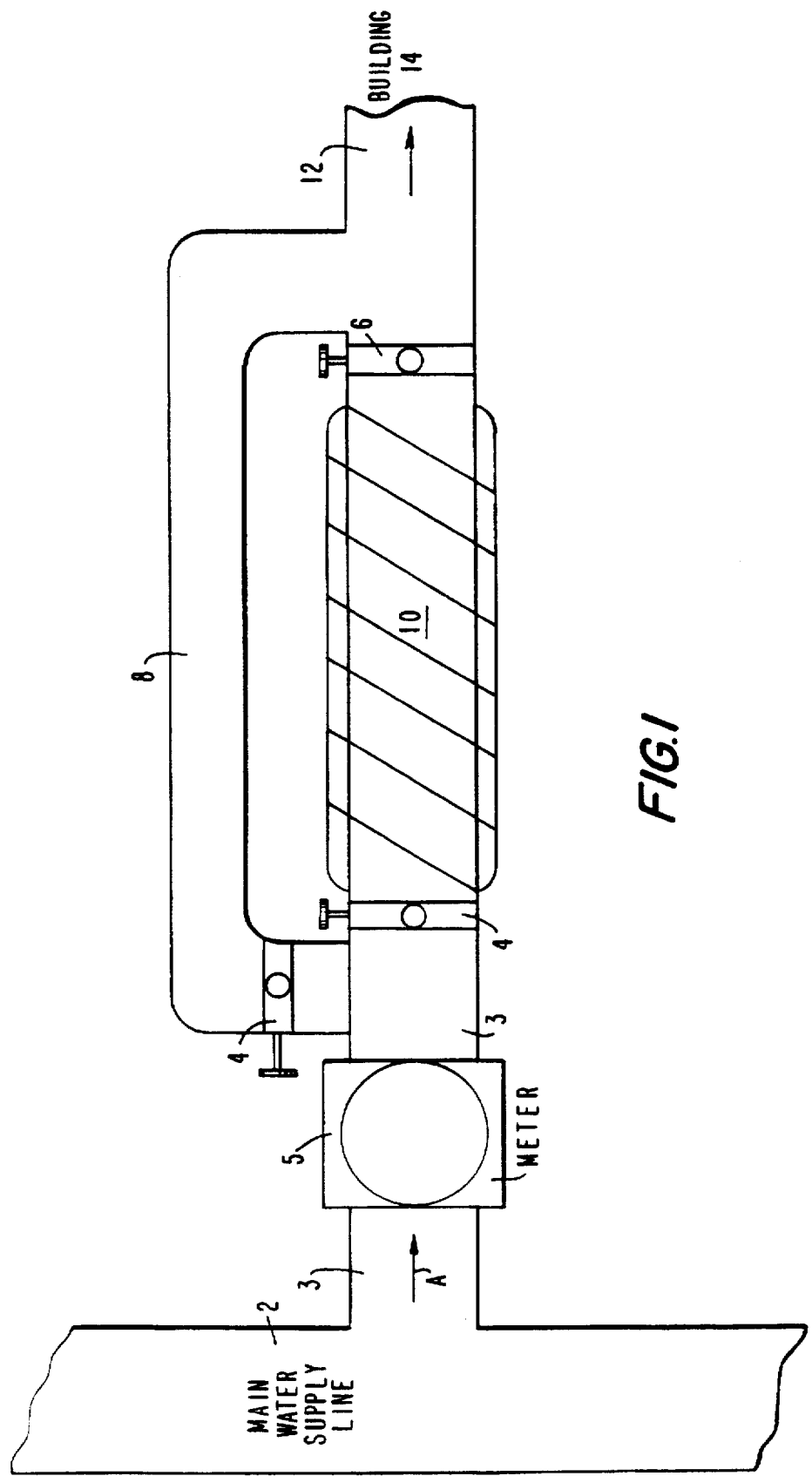
FIG. 1 is a plan view of the novel variable flow demand regulator with a water supply line.

FIG. 1 is a plan view of the novel variable flow demand regulator 10 positioned in an incoming water line 3. Referring to FIG. 1, water travels from an external city/county water line 2 and into inlet water line 3 flowing in the direction of arrow A. A single typical water meter 5 usually controls the water supply for an entire building 14 such as a residential apartment building, condominium building, office building and the like such as those described previously. The buildings would generally require multi-units where at least two separate apartments/condominiums are dependant on the single external water meter for the entire building. Again, tenants and occupants of such a building that utilizes the invention would generally rely on the single meter 5 for the entire building. In a preferred application, the novel regulator is positioned between the building's water meter 5 and the building's incoming water line 12 and can include bypass valves 4 and 6 and bypass line 8 which allows incoming water to bypass the novel regulator 10 when the regulator 10 is being serviced.

Figure 2:
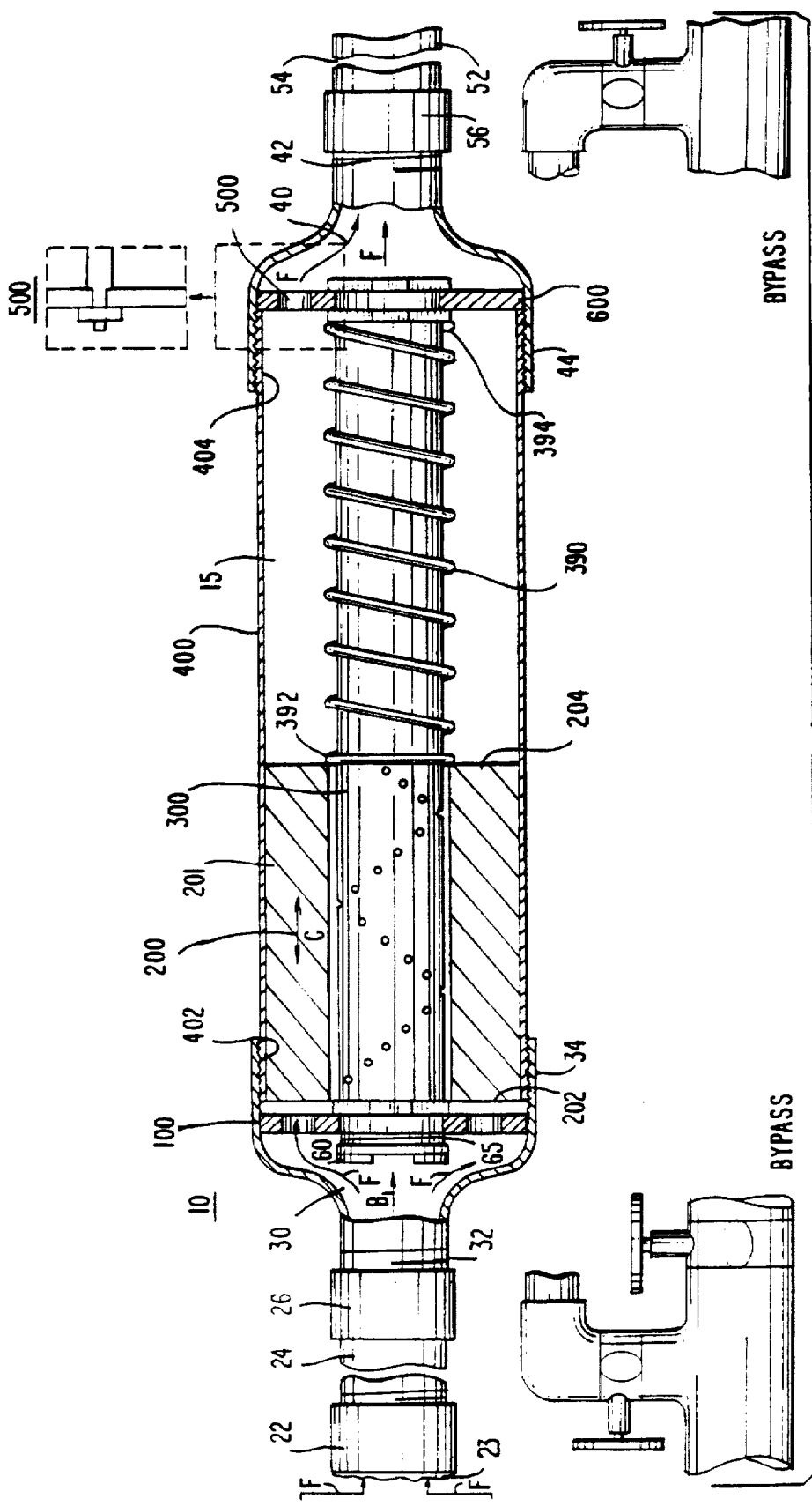
FIG. 2 illustrates a partial exploded view of the novel variable flow demand regulator of FIG. 1.

FIG. 2 illustrates a partial exploded view of the novel variable flow demand regulator 10 of FIG. 1. Regulator 10 can include inlet side couplers 22 and 26 having internal threads with a coupling pipe 24 having mateable external end threads. Coupler 26 can connect pipe 24 to the external threads of hollow inlet flange 30 having external threads 32 on inlet side and internal threads on cap side 34 which mateably attaches to external threads 402 on cylindrical outer casing 400 (which will be discussed in greater detail in reference to FIG. 6). Opposite external threads 404 mateably connect to internal cap threads 44 of outlet flange 40 which in turn is connected by threads 42 to coupler 56, coupling pipe 54 and other coupler 52 which connects to pipe 12 FIG. 1. Regulator 10 further includes entry end plate 100 (described in detail in FIGS. 3A–3B), sliding cylindrical piston valve 200(described in detail in FIGS. 4A–4B) which can slide in the direction of double arrows C over access pipe 300 (described in detail in FIG. 5). Cylindrical piston valve 200 has an end 204 which abuts against an end 392 of spring 390 and opposite spring end 394 abuts against one side of exit end plate 600 (described in detail in FIGS. 8A–8B). An adjustable bleeder valve 500 (described in detail in FIG. 7) allows for operator control of the regulator 10 so that an operator can adjust the piston 200 and spring 390 compression of FIG. 2.

Figure 3B:
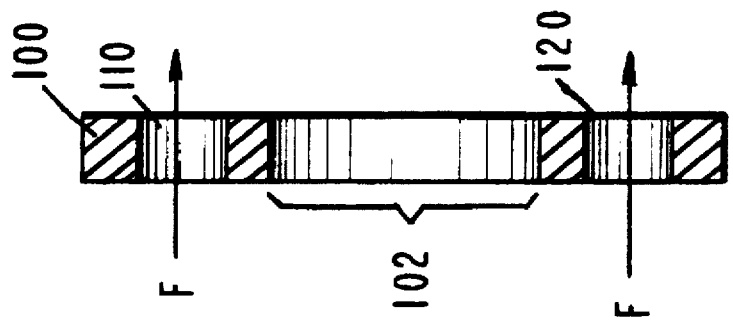
FIG. 3B is a side view of the entry end plate of the novel regulator of FIG. 2.
Figure 3A:
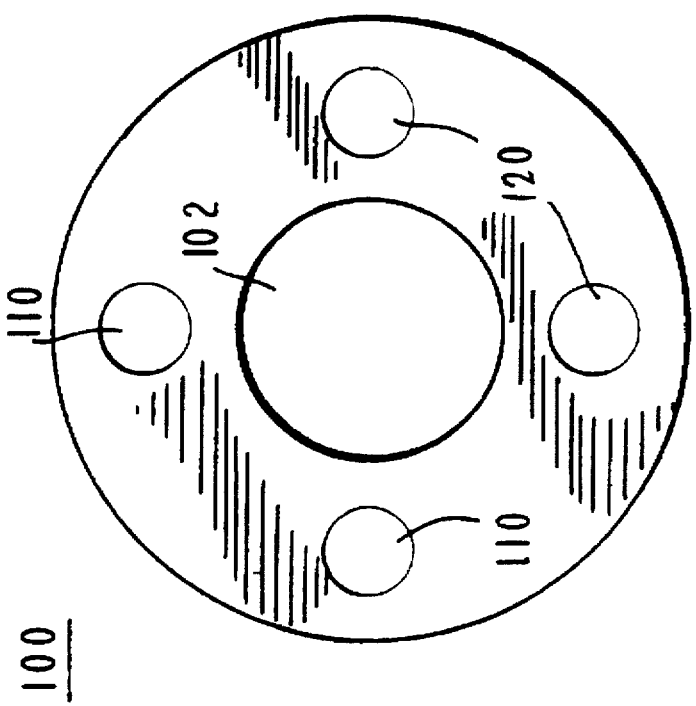
FIG. 3A is a front view of the entry end plate of the novel regulator of FIG. 2 along arrow B.
Figure 5:
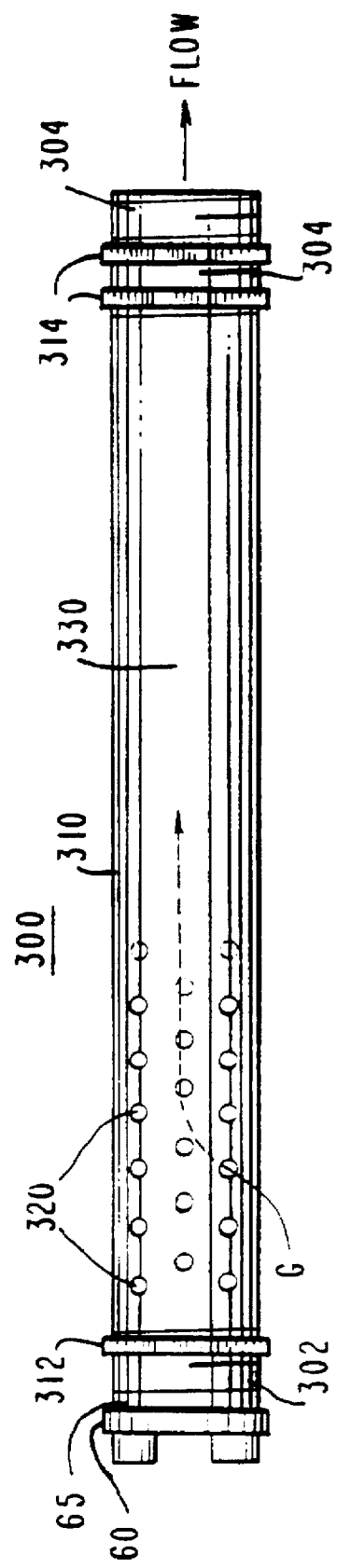
FIG. 5 is a side view of the threaded axis pipe with hole pattern of the novel regulator of FIG. 2.

FIG. 3A is a front view of the entry end plate 100 of the novel regulator 10 of FIG. 2 along arrow B. FIG. 3B is a side view of the entry end plate 100 of the novel regulator 10 of FIG. 2. End plate 100 is of an o-ring type shape including a center axial opening 102 and upper and lower entry flow holes 110 and 120. Opening 102 fits about threaded end 302 of the access pipe shown clearly in FIG. 5 to abut against locknut 312. Note as seen in FIGS. 2 and 5, endcap 60 having threads 65 closes end 302 of access pipe 300. Referring back to FIGS. 2 and 3A–3B, water flows in the direction of arrows labelled F.

Figure 4B:
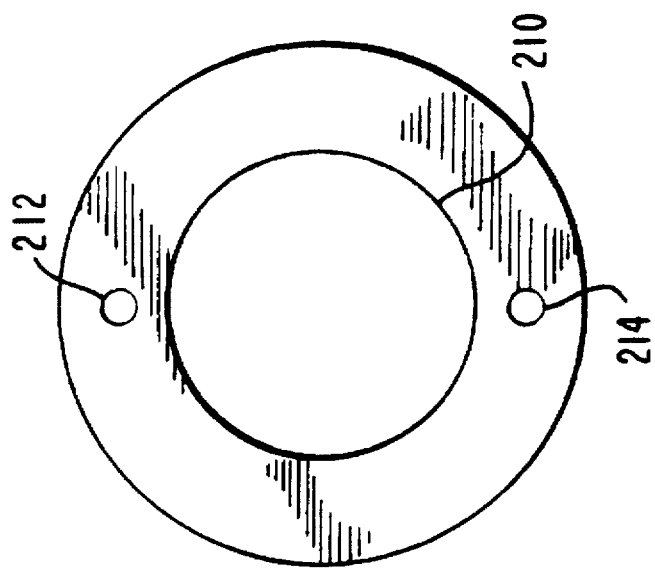
FIG. 4B is a front view of the sliding cylindrical piston valve of FIG. 2 along arrow B.
Figure 4A:
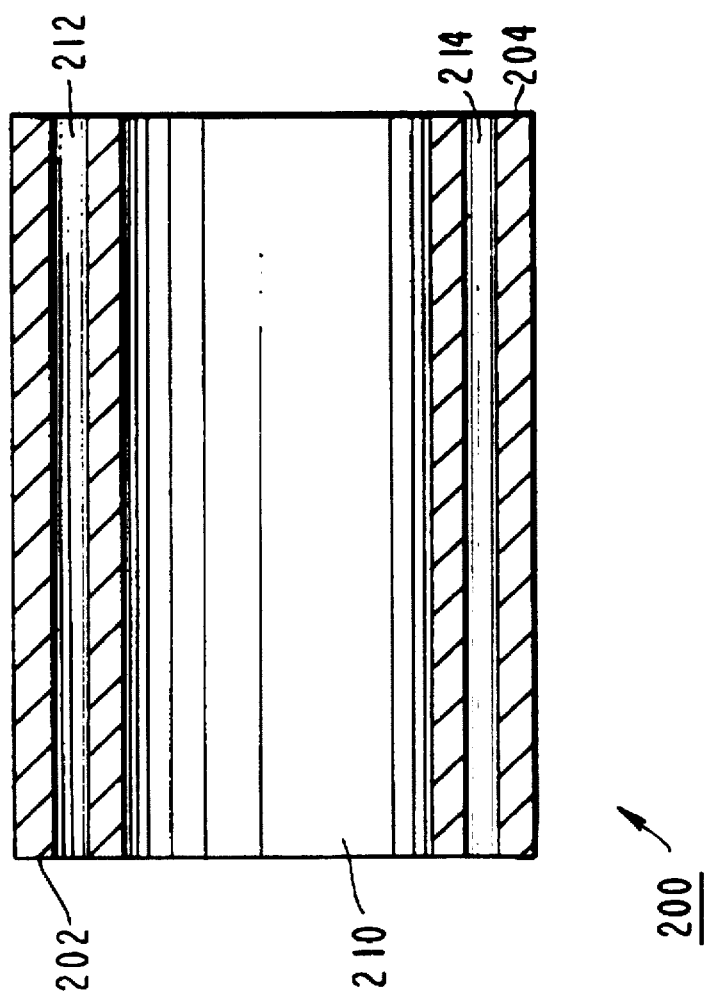
FIG. 4A is a side view of the sliding cylindrical piston valve of the novel regulator of FIG. 2.

FIG. 4A is a side view of the sliding cylindrical piston valve 200 of the regulator 10 of FIG. 2. FIG. 4B is a front view of the sliding cylindrical piston valve 200 of FIG. 2 along arrow B. Referring to FIGS. 4A–4B, piston valve 200 includes small longitudinal through-holes 212, 214 extending from one end 202 to another end 204. A center axial hole 210 is sized to slide about the circumference 310 of access pipe 300 of FIG. 5. In operation water flows from inlet line 3 to the upper inlet chamber of regulator 10 through holes 212, 214. When water flow pressure flows downline 14, water pressure pushes end 202 of piston valve 200 to the right direction of arrow C (shown in FIG. 2) with piston side 204 pressed against side 392 of spring 390.

FIG. 5 is a side view of the threaded axis pipe 300 with staggered hole pattern 320 of the novel regulator 10 of FIG. 2. Access pipe 300 can be a threaded Schedule 80 PVC pipe, acrylic pipes, metal materials and the like. Referring to FIGS. 2 and 5, end 202 of piston 200 sliding in the right direction along arrow C exposes holes 320 of the access pipe 300 allowing water to flow into the middle of access pipe 300 in the direction of arrow F. The greater the pressure of water from the main water supply line 2, the more piston 200 moves in the right direction of arrow C and the more holes 320 that are exposed in access pipe 300. Lock nuts 314 rotate about threaded end 304 of access pipe 300 and abut to opposite sides of exit end plate 600 which is described more clearly in FIGS. 8A–8B. Referring to FIGS. 1, 2 and 5, piston 200 adjusts for the high and low usage line 2 and further .. spring 390 allows for greater compression when the water demand from building 14 creates a low pressure zone on the opposite side 204 of piston 200.

Figure 6:
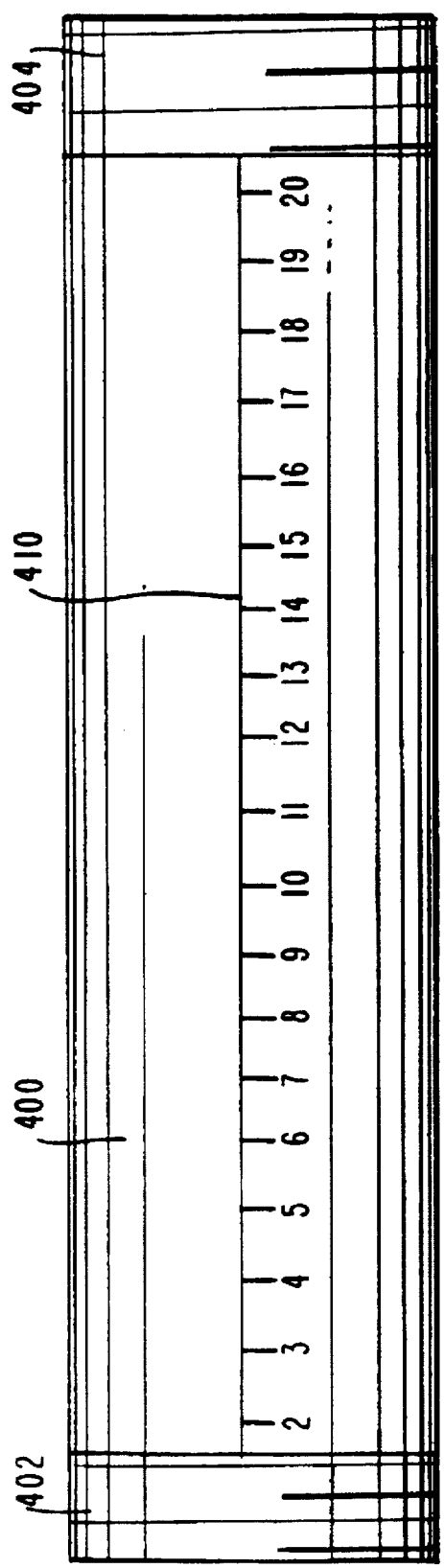
FIG. 6 is a side view of the outer cylindrical casing of the novel regulator of FIG. 2.

FIG. 6 is a side view of the outer cylindrical casing 400 of the novel regulator 10 of FIG. 2. Casing 400 can be a see-though plastic type exterior such (ACRYLIC PIPE), as Schedule 80 PVC pipe, and the like. Casing 400 has threaded ends 402 and 404 which mateably rotate about internal cap threads 34 and 44 of flange ends 30 and 40 respectively shown more clearly in FIG. 2 and can optionally include an engraved or printed scale 410 in inches, centimeters and the like.

Figure 7:
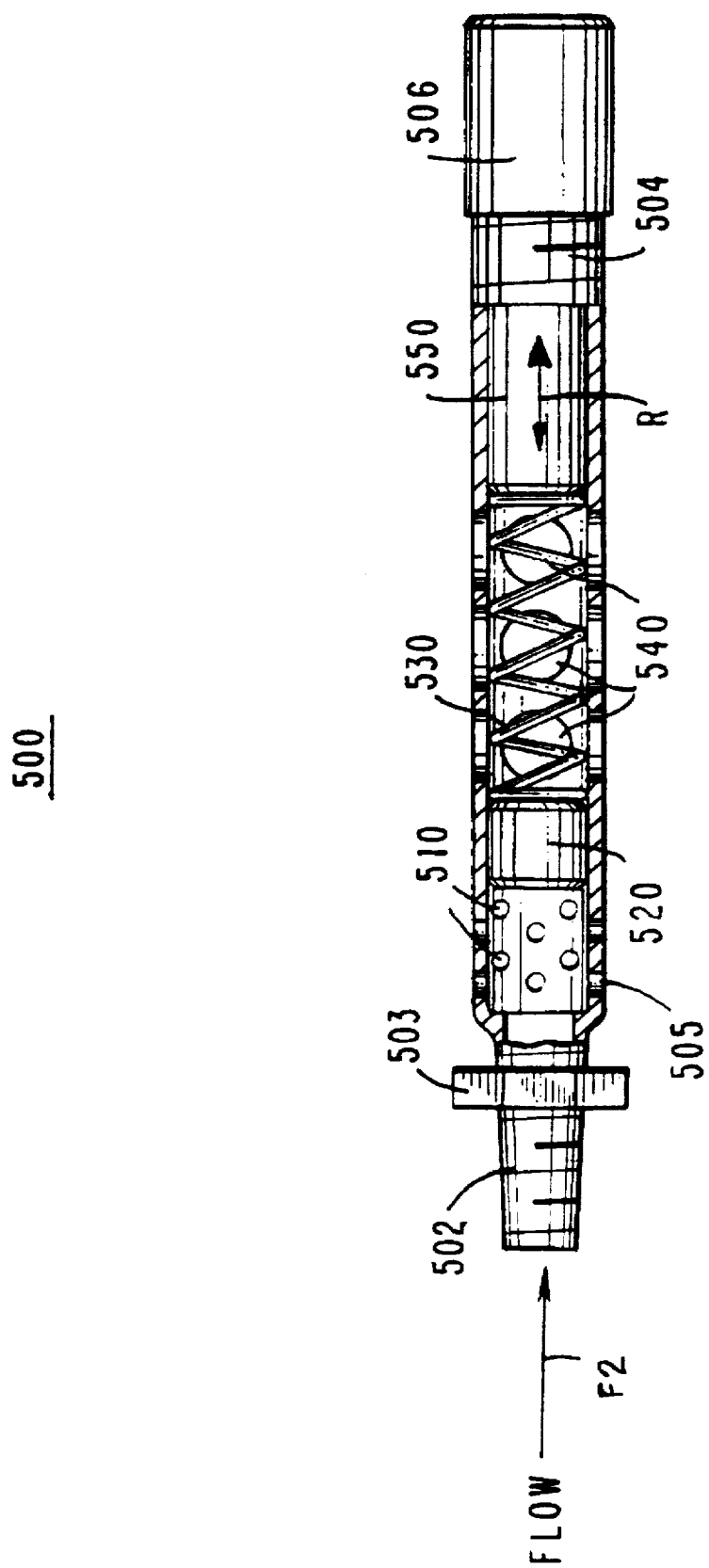
FIG. 7 is a side view of the bleeder valve used with novel regulator of FIG. 2.

FIG. 7 is a side view of the bleeder valve 500 used with novel regulator 10 of FIG. 2. FIG. 8A is a front view of the exit end plate 600 of the novel regulator 10 of FIG. 2 along arrow B. FIG. 8B is a side view of the exit end plate 600 of the novel regulator 10 of FIG. 2. Referring to FIGS. 2 and 8A–8B, threaded end 502 of bleeder valve 500 fits within the entry flow hole opening 610 of exit end plate 600 where locknut 503 holds the bleeder valve 500 in place. Bleeder valve includes a cylindrical casing 505 having external bleed holes 510 which allow fluid passing into valve 500 along arrow F2 to exit inside flange 40. A calibrated spring 530 is located between a solid spacer 550 and a piston 520, where the spacer is adjustable to be movable in the direction of arrow R by the clockwise rotation of end cap 506 being rotated about threads 504. Extra holes 540 in the outer casing 505 of bleed valve 500 allow for further water bleed off into the inside of flange 40 to allow for bleeder valve piston movement. Bleed valve 500 can be serviced when the bypass valves 4 and 6 shown in FIG. 1 are engaged for redirecting flow through bypass line 8.

Although the preferred embodiment of the invention is described using the novel variable flow regulator for controlling the main water supply to multifamily buildings/ homes, the invention would also have applicability for supplying other types of structures such as group homes, single family residences and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A variable demand flow regulator valve system for regulating city supplied water to a multi-use building, comprising:

an external water supply line;

a building water meter having an inlet and an outlet, wherein the inlet is connected to the external water supply line;

a variable demand flow regulator valve having an inlet and an outlet, wherein the inlet is connected to the outlet of the building water meter;

a main incoming water line for the building connected to the outlet of the variable flow demand regulator valve; and a bypass line including a bypass valve having an open position and a closed position, wherein the open position allows for water from the external water supply line to bypass the variable demand flow regulator valve and pass through the bypass line into the building, and the closed position causes the water from the external water supply line to pass into the variable demand flow regulator valve.

2. The variable demand flow regulator valve system of claim 1, wherein the multi-use building is a multiple unit apartment building, a multi-unit condominium building, or a multi-unit office building.

3. A variable demand flow regulator valve for regulating fluid flow based on variable pressure supply and variable pressure demand, the valve comprising:

a cylindrical housing having an inlet side and an outlet side;

a hollow pipe coaxial with the cylindrical housing, the hollow pipe having a closed inlet end and an open outlet end, the hollow pipe further having a plurality of openings along an exterior wall adjacent to the inlet end;

a slidable cylindrical piston valve which slides about the exterior circumference of the hollow pipe adjacent to the inlet end, the piston valve having a first position for substantially covering the exterior wall openings of the hollow pipe, the piston valve having at least one through-hole running from a first end to a second end;

a compression spring coaxially mounted about the hollow pipe adjacent to the open outlet end, the compression spring having a first end and a second end, the first end abutting against the first end of the piston valve and the second end abutting against an edge adjacent to the outlet side of the cylindrical housing, wherein fluid passing into the inlet side of the cylindrical housing passes through the at least one through hole of the piston valve until supply side pressure of the incoming fluid and demand side pressure of the outgoing fluid causes the piston valve to compress against the compression spring to allow incoming fluid to pass into the plurality of exterior wall openings of the hollow pipe and to the open outlet end of the hollow pipe.

4. The variable demand flow regulator valve of claim 3, further comprising:

a bleeder valve positioned adjacent to the outlet side of the cylindrical housing for adjusting the piston valve position.

5. The variable demand flow regulator valve of claim 3, further comprising:

a bypass line including a bypass valve having an open position and a closed position, wherein the open position allows for fluid from an external fluid supply line to bypass the variable demand flow regulator valve and pass through the bypass line, and the closed position causes the fluid from the external fluid supply line to pass into the variable demand flow regulator valve.

6. The variable demand flow regulator valve of claim 5 for use with:

a building meter having an inlet and an outlet, wherein the inlet of the meter is connected to the external fluid supply line, and the outlet of the meter is connected to the bypass valve.

7. The variable demand flow regulator valve of claim 3 for use in a multi-use building, the multi-use building being a multiple unit apartment building, a multi-unit condominium building, or a multi-unit office building.

8. The variable demand flow regulator valve of claim 3, wherein the closed inlet end of the hollow pipe further comprises:

an inlet end plate closing off the inlet end of the cylindrical housing, the inlet end plate having a center hole opening to the inlet end of the hollow pipe, and a second opening adjacent to an edge of the inlet end plate for allowing fluid communication between a first side and a second side of the inlet end plate;

a screwable cap for sealingly closing the center hole of the inlet end plate and the inlet end of the hollow pipe.

9. The variable demand flow regulator valve of claim 4, further comprising:

an outlet end plate closing off the outlet end of the cylindrical housing, the outlet end plate having a center hole opening to the outlet end of the hollow pipe, and a second opening adjacent to an edge of the outlet end plate for allowing fluid communication between a first side and a second side of the outlet end plate, wherein the bleeder valve is positioned in the second opening of the outlet end plate.

10. The variable demand flow regulator valve of claim 9, wherein the closed inlet end of the hollow pipe further comprises:

an inlet end plate closing off the inlet end of the cylindrical housing, the inlet end plate having a center hole opening to the inlet end of the hollow pipe, and a second opening adjacent to an edge of the inlet end plate for allowing fluid communication between a first and a second side of the inlet end plate:

a screwable cap for sealingly closing the center hole of the inlet end plate and the inlet end of the hollow pipe.

11. A variable demand flow regulator valve for regulating fluid based on variable pressure supply and variable pressure demand, comprising:

a hollow housing having an inlet and an outlet;

a hollow valve element within the housing, the valve element having a closed inlet and an open outlet and having a plurality of openings through an exterior wall for allowing fluid flow into an interior of the hollow valve element;

a piston within the housing and circumscribing the hollow valve element, the piston being slidable about the exterior wall of the hollow valve element, from a first position substantially covering the plurality of openings of the valve element to a second position exposing one or more of the plurality of openings, whereby fluid passing into the inlet of the housing pushes the piston toward the outlet of the housing, thereby exposing one or more of the plurality of openings in the hollow valve element, and the fluid flows through the plurality of openings into the interior of the hollow valve element and thence through the open outlet, until supply-side pressure of the incoming fluid and demand-side pressure of the outgoing fluid causes the piston to reach an equilibrium position within the housing.

12. The variable demand flow regulator valve of claim 11, further comprising compression means within the housing for permitting the piston to slide from the first position to the second position and to reach the equilibrium position.

* * * * *